United States Patent [19]

Stern et al.

[11] 3,824,454

[45] July 16, 1974

[54] CALIBRATED ELECTROSTATIC CHARGE DETECTOR AND METHOD FOR MEASURING THE STRENGTH OF ELECTROSTATIC FIELDS

[75] Inventors: Sidney Charles Stern, Framingham; Ralph Gray Eldridge, Lexington; John Clark Johnson, Westboro; David Karl Beaver, Tewksbury, all of Mass.

[73] Assignee: Enviro/Tech Sciences, Inc., Newton Upper Falls, Mass.

[22] Filed: Oct. 18, 1971

[21] Appl. No.: 190,073

[52] U.S. Cl. .................................. 324/32, 324/156
[51] Int. Cl. ....................... G01r 5/28, G01r 29/11
[58] Field of Search .............. 324/32, 156, 109, 72

[56] References Cited
UNITED STATES PATENTS

| 2,781,452 | 2/1957 | Lofgren et al. | 324/32 |
| 3,370,225 | 2/1968 | Winder | 324/32 |

FOREIGN PATENTS OR APPLICATIONS

| 521,631 | 3/1955 | Italy | 324/32 |

Primary Examiner—Alfred E. Smith
Assistant Examiner—Ernest F. Karlsen

[57] ABSTRACT

Disclosed is an electrometer having a sensing element located within a conductive housing. A shutter encloses the sensing element and its conductive plate within the housing. An iris diaphram is provided to restrict the electric field entering the housing. Upon the periodic closing of the shutter, there is formed a Faraday cage with the sensing element brought into contact with the shutter and housing. The controlling circuitry is separated and shielded from the sensing means.

An inert gas is used to surround the sensing element to substantially prevent fires and explosions when the instrument is used in an explosive atmosphere.

The control circuitry provides for asymmetrical control signals such that the shutter has a shorter closed cycle as opposed to an open cycle.

A calibration plate is disclosed jointly used in combination with the sensing element to establish predetermined voltage levels in the operational environment in which the instrument is used.

17 Claims, 4 Drawing Figures

CALIBRATED ELECTROSTATIC CHARGE DETECTOR AND METHOD FOR MEASURING THE STRENGTH OF ELECTROSTATIC FIELDS

BACKGROUND OF THE INVENTION

This invention relates to devices for measuring electrostatic fields and more particularly to electrometers.

A number of devices have been suggested for measuring an electrostatic field. One suggested device uses a metallic probe which assumes the same potential as the surrounding environment. The electrostatic field is calculated from the potential gradient — the probe obtains taking into consideration such factors as the distance of the probe from the test surface. The probe does not assume the potential of the field for several minutes. Thus, this device provides slow measurements and is unacceptable where measurements are to be made in the environment of a rapidly changing field. In addition, such a device is very often constructed with sharp points or edges. Charges building of these edges may be subjected to corona currents that thereafter result in ignition in explosive environments.

Still another suggested device uses a radioactive probe. However, the ionization produced by such a probe has been observed to effect the electric field itself. Thus, the voltage potentials obtained with a highly radioactive probe have been found to be altered by as much as 30 percent when the probe is exposed in still air. This is due to a cloud of ions forming and remaining about the probe. A requirement of this device, therefore, is that the probe's radioactive strength be very low. For example, if the radioactivity level of the probe is between 10 to 1,000 micro curies, a higher than $1 \times 10^6$ megohm input resistance is required. Such a resistance is extremely difficult to maintain. Still another factor mitigating against such a device is that the level of ionization constantly decays. For example, Polonium 210 has a half life of 138 days. This steady decay results in erroneous readings. Finally, such a device may cause health problems. Polonium 210 is extremely dangerous if it is retained in the lungs or ingested in the gastrointestinal system of man.

One suggested solution to the difficulties of prior devices has been suggested by Winder in U.S. Letters Pat. No. 3,370,225.

In the Winder device a conductive probe member is located within a housing which is isolated from an electrostatic field when the shutter closes. However, exposed to environmental influences are various instrument components that are located in the housing and proximate the probe. Thus, ambient air heating or cooling, air motion and deposition of moisture in the air on these components will cause changes in the values of the electrometer tube and associated circuitry. Thus, such a device would be difficult to calibrate and maintain calibrated. Furthermore, readings would, it is believed, be unreliable.

In addition, Winder discloses the earth or power ground shall be identical to the signal ground. By doing so, this device is restricted to making measurements solely with respect to one ground. Where grounds differ, as for example, where the electric field is relative to a moving web on equipment not at the earth ground potential the measurement will not reflect the actual electrostatic field of that moving web.

Furthermore, such a device as disclosed by Winder is unable to detect small surface areas with high electric charges. The reason for this is that the signal output of the sensing device is a function of distance. If the field is very strong and saturates the sensor output, the only remedy is to move the device further away. If the field is of a non-uniform width or length such a movement away from the field would cause an erroneous reading. Finally, this device would not operate safely in an explosive environment. A charge building up on the sensing element, may well serve as the basis for corona discharge into the explosive environment.

SUMMARY

The subject of this invention is an electrometer for measuring an electrostatic field. A sensing means is provided. In addition fluid means, such as for example a tank of nitrogen gas with associated means of delivery, are provided to surround the sensing means to substantially inhibit corona discharge in the presence of a volatile atmosphere.

In a further context, this invention provides an iris diaphragm for restricting access of the electric field to the sensing means.

In still another aspect of this invention, there is provided an electrically conductive housing having an aperture for the admission of at least a part of that electric field. Sensing means are provided within the housing and are responsive to the field for providing a signal. The signal is indicative of the strength of the field. An electrically conductive shutter means is in electrical contact with the housing and adapted in an open condition to allow the sensing means to sense at least part of the field and in a closed condition to electrically shield the sensing means from the field. Operating means are provided for selectively opening and closing the shutter means and interpreting the electrical signal. The shutter in combination with the housing and the responsive means shields the sensing means in the shutter's closed condition from the operating means and the field.

The device of this invention may, for example, in one embodiment, be so designed as to isolate the signal ground from the earth ground, the resulting separation permits calibration of the electrometer independent of the earth or power ground and readings to be had where the source of the electrostatic field is substantially independent of the earth ground.

In still a further consideration, the invention provides for an asymmetrical control circuit which closes the shutter for a proportionately short period of time of the over-all cycle which includes opening and closing the shutter. The control circuit provides a ramp generator timing means and further provides a ramp generator timing means and further provides means for varying the rate of reading of the electrostatic field from DC to AC readings.

Thus, it is an object of the invention to provide a novel and improved electrometer instrument.

Another object of this invention is the ability of measuring an electrostatic field without substantial modification of the electric field potential.

Still another object of the invention is the provision of an instrument which can be operated over a relatively long period of time without significant drift.

Other and further objects, features and advantages of the invention will appear more fully from the following

Figure 1:
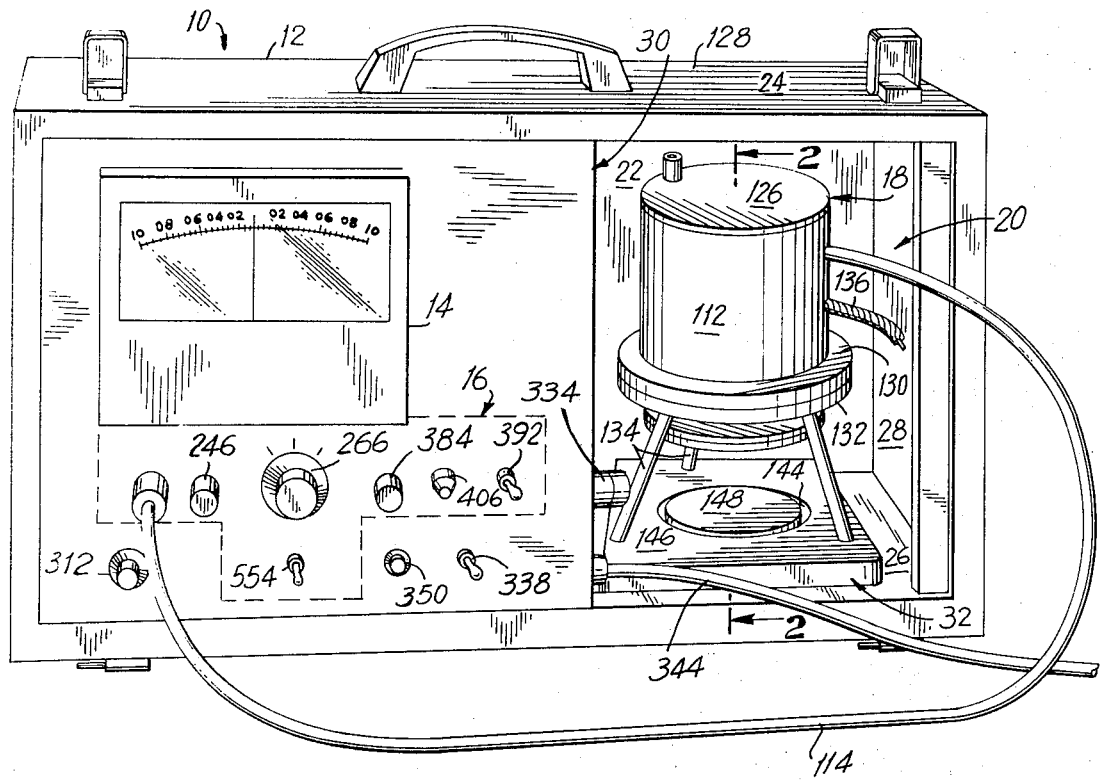
FIG. 1 is a perspective view of an electrometer constructed in accordance with the teachings of the invention.

DESCRIPTION OF THE PREFERRED EMBODIMENT:

In accordance with the teachings of the present invention there is generally disclosed an electrometer 10 (FIG. 1) disposed within a carrying case 12. Electrostatic readings are indicated upon a meter 14 or other indicating means. In addition, there are provided controls 16 for adjustment of the meter 14, calibration and the like, as shall be more fully described hereinbelow. In the embodiment dislosed, a housing unit 18 (see FIGS. 1, 2 and 3) resides within a rectangularly shaped compartment 20 of the case 12. The compartment 20 is defined by a rear wall 22, top, bottom and side walls 24, 26, and 28, respectively, of the case 12 and a side wall (shown in edge view only) of the component carrying portion 30 which in turn, houses the meter 14, controls 16 and part of the associated circuitry 200. It will be observed that the housing unit 18 stands upon a calibration plate 32. The function of the calibration plate 32 is more fully described below.

The housing unit 18 may comprise a substantially cylindrical shaped inner housing 34 which is open at either end. While the general configuration of the inner housing 34 and unit 18 are cylindrical it is to be understood that any shape would be satisfactory. The inner housing 34 may be made of an electrically conductive material such as copper or the like. Affixed at one end is a face plate 36. The face plate 36 is secured, by welding, soldering, or the like to an interior wall of the inner housing 34. The face plate 36 may be constructed of copper or other electrically conductive material. Centrally disposed in the face plate 36 is an aperture 38. The aperture 38 may have a generally circular configuration. The plate aperture 38 is intended to admit an electrostatic field into the inner housing 34. While a circular aperture 38 is disclosed (FIG. 2) and preferred, any configuration may be employed. A holder 40 having a generally spool shaped configuration is secured to an exterior lateral surface of the face plate 36. The holder 40 may be made of an electrically conductive material and secured to the face plate 36 by soldering, welding, or the like. One of the holder's 40 laterally extending rims 42 is secured to the plate 36. Secured to the other rim 44 of holder 40 is an adjustable iris diaphragm 46. The iris diaphragm 46 may be constructed of copper or other electrically conductive material and constructed in a manner well known in the art.

It is to be noted that the centrally disposed aperture 48 (FIG. 2) of the holder 40 has substantially the same configuration as the aperture 38 of the face plate 36. Clearly, other configurations may be used. The iris diaphragm 46 restricts the amount an electrostatic field having access to the interior of inner housing 34. The function and purpose of the iris 46 will be more fully discussed below.

Secured within the inner housing 34 and spaced from the face plate 36 is a support plate 50 which may be, for example, disc like in shape. The support plate 50 may be constructed of an electrically conductive material, such as copper, and secured to the inner wall of the inner housing 34 by solder or the like. The support plate 50 has therein a centrally disposed port or aperture 52. The port 52 of the support plate 50 may be substantially the same configuration as the aperture 48 of the iris 46 and the aperture 38 of the holder 40. Other configurations may be used, thus effecting the field entering into the inner housing 34. There are disposed within and through the support plate 50 a plurality of gas portals 54. The gas portals 54 are disposed (FIG. 2) about the periphery of the centrally disposed aperture 52 and may be, for example, substantially smaller in dimension.

A shutter mechanism 56 may be affixed to the support plate 50 on the lateral surface thereof which is disposed proximate to the face plate 36 by screws, solder, or other joining means. The shutter mechanism 56 may be one ordinarily known in the art and may comprise a five leaf metallic shutter arrangement with the shutters enclosing an area substantially of the same dimension as the apertures 52, 48, and 38 of the support plate 50, iris diaphragm 46, the holder 40, respectively. The shutter mechanism 56 may generally be disc-like in configuration and electrically conductive. Thus, the shutter 56 may be constructed of non-anodized metal for improved electrical conductivity.

As thus far described, the inner housing 34 may be in electrical contact with the face plate 36, holder 40, iris diaphragm 46, support plate 50, and shutter 56. Within the periphery of the shutter mechanism 56 there are a plurality of gas portals 58. These latter gas portals 58 may be in registry with the gas portal 54 of the support plate 50. The function of these gas portals 54 and 58 will be more fully described below.

Secured to the support plate 50, on the lateral surface thereof which is opposed to the face plate 36, may be a solonoid 60. The solonoid 60 may be one well known in the art. Extending from within and without of the solonoid 60 is its plunger 62. Secured to the plunger 62, as, for example, in an aperture formed therein, is a pin 66. Adjacent the solonoid 60 and proximate the plunger 62 is a pivot pin 68. The pivot pin 68 may be secured to the support plate 50 by welding, soldering or the like. Both the solonoid 60 and the pivot pin 68 are proximate the aperture 52 in the support plate 50. The pivot pin 68 extends parallel the axis of the inner housing 34. Approximately 180 degrees with respect to a radius (not indicated) of the support plate 50 which extends through pivot pin 68 is a pin 70 similarly affixed to the support plate 50 adjacent the inner wall of inner housing 84.

Figure 3:
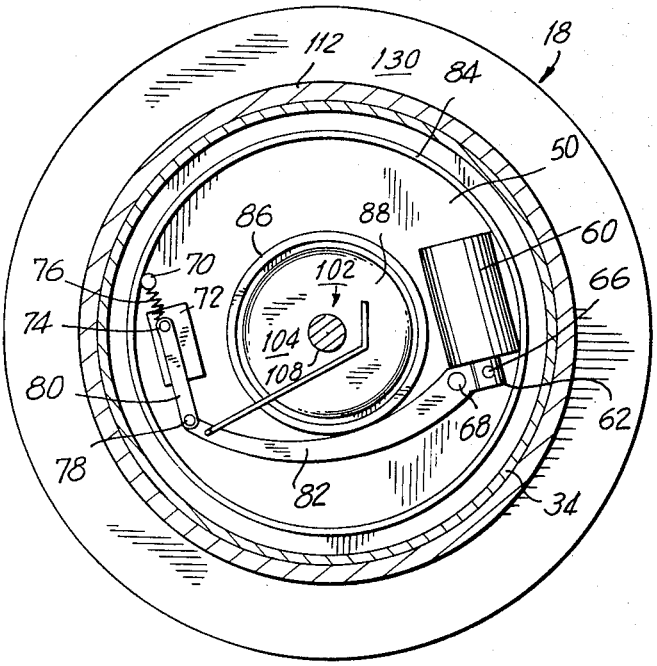
FIG. 3 is a sectional view of the electrometer housing unit of FIG. 2 taken along lines 3—3.

Within the support plate 50 and extending therethrough is a substantially rectangular aperture 72 (see FIG. 3). Extending through that aperture 72 is a pin 74. The pin 74 engages the shutter mechanism 56 in a manner well known in the art. A compression spring 76 serves, in the preferred embodiment, as a resilient means for pulling pin 74 toward pin 70. Attached to pin 74 is a substantially rod-shaped slide arm 80. An arm 82 which may be made of an electrically conductive material, such as copper, has a somewhat arcuate shape. One end of the mechanical arm 82 is pivotally secured to the pin 66 of the plunger 62 and the pivot pin 68. The other end of the arm 82 is pivotally secured to the end of the slide arm 80 not connected to the shutter pin 74. The slide arm 80 may be secured to the arm 82 as by a pivot pin 78. Each of the means for operating the shutter mechanism 56 (pins 70, 74, 78, 68, and 66; arms 80 and 82; and spring 78) may be made of electrically conductive material, as is well known in the art.

An electrically conductive shield 84 may have a substantially cylindrical configuration, conforming to the shape of the inner housing 34, and is affixed to the support plate 50 by well known means. This shield 84 encloses the pins 70, 74, 78, 68, and 66, springs 78, arms 80 and 82 and solenoid 60. This shield 84, which is of an electrically conductive material may be made, for example, of copper or the like. A second such shield 86 may also be cylindrical in shape and reside coaxially within the housing 34 and surrounds the port 52 of the support plate 50. Affixed to the mechanical arm 82 is an electrically conductive wire-like contact 88. The contact 88 is substantially L-shaped with one leg thereof rising parallel to the axis of the inner housing 34 and the other leg extending substantially radially and across the port 52 of the support plate 50. The function of this contact 88 will be more fully described below.

Figure 2:
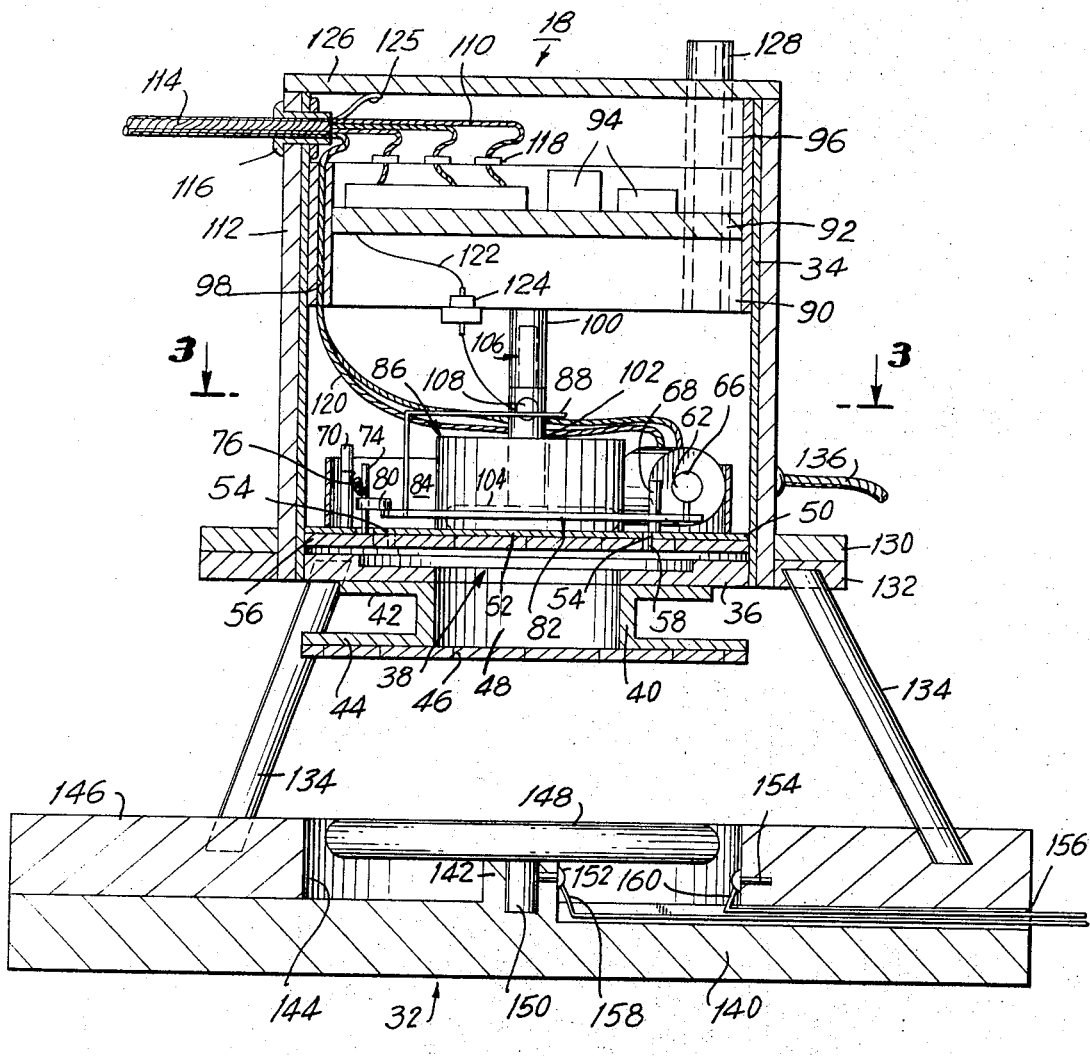
FIG. 2 is a sectional view of the electrometer housing unit tkaen along line 2—2 in FIG. 1.

Within the inner housing 34 and affixed to the interior wall thereof is a cylindrically shaped component can 90 (FIG. 2). The component can 90 is spaced above the support plate 50 and face plate 36 and may be secured to the side walls of the inner housing 34 by welding, soldering, or similar means. Within the can 90 is a component support plate or chassis 92. Residing on the chassis 92 and secured thereto may be electrical components 94.

The can 90 may be sealed at either opposed end to form a completely sealed and electrically shielded holder for the electrical component 94. The components 94 may be sealed and secured against vibration, moisture, ambient temperature changes and air motion by means well known in the art such as shock mounting or the like. Extending through the can 90 and adjacent the peripheral edge thereof is a gas conduit 96. This conduit 96 provides communication between the uppermost part of the inner housing 34 and the areas below the can 90 including support plate 50 and the components (such as solenoid 60) mounted thereon. In a similar manner, a second conduit 98 extends through the can. The gas conduit 96, in addition, may have an upwardly extended portion. The purpose of this gas conduit 96 will be more fully discussed below. Coaxially secured to the center of the bottom of the can 90 and extending downwardly toward the support plate 50 may be an insulated member 100. The insulated member 100 may be made for example of a phenolic and secured by the conductive bottom plate of can 90 by screws or the like.

Secured to the member 100 and extending downwardly within the housing 18 may be substantially mushroom shaped sensing means 102. The sensing means 102 may be made of, for example, an electrically conductive metal such as aluminum. The substantially cylindrically round edge sensing mushroom head or plate portion 104 of the sensing means 102 is proximate the aperture 52 of the support plate 50 and surrounded by the shield 86, within the shield 84. The coaxially positioned stem 106 of the sensing means 102, which is the portion secured to the insulated member 100, extends above the shield 86 and has therein an electrical contact set screw 108. The electrical contact 108 is so disposed that the arm 88 makes contact therewith in a manner as to be hereinafter described.

The inner housing 34 resides within and is affixed to the interior wall of the outer housing 112. The outer housing 112 may be of a generally cylindrical configuration and electrically conductive so as to shield the inner housing 34 from unwanted or stray electrostatic fields.

A cable 114, which contains a plurality of signal and power bearing lines, extends through aligned apertures in the inner and outer housing 34 and 112, respectively. A grommet 116, which may be made of rubber, resides within the apertures and serves to hold the cable 114 in place, as well known in the art. Electrical feed through connectors 118 are employed to engage and hold signal and power lines 110 of the cable 114 as they enter the can 90. These connectors 118 serve to keep can 90 air-tight. Power lines 120 enter the housing unit 18 by means of the cable 114 through conduit 98 and the can 90 and thence to solonoid 60 to supply power thereto, in a manner well known in the art. In a similar manner, a signal line 122 interconnects the electrical components 94, within the can 90, to the sensing means 102 through the electrical plug 124 and the contact button 108. A button contact or other plug means 124 is used to interconnect the line 122 as it leaves the can 90 and enters into the area between the can 90 and the sensing means 102. The cable 114 interconnects the housing unit 18 to the instrument package 30 (FIG. 1). A signal ground 125 is attached to a stop 126 by means well known in the art.

The top portion of the outer housing 112 may be electrically closed by the electrically conductive lid or top 126. This top 126 has therein and extending therethrough a gas conduit 128. The gas conduit 128 is in communication with the gas conduit 96 of the can 90. Attached to the gas conduit 128 may be a source of inert fluid such as a tank of nitrogen gas (not shown) for supplying gas to the unit 18 under predetermined pressure.

The outer housing 112 may be secured to the internal side wall of a ring 130. The ring 130 serves as a positioning means and may be secured to the outer housing 112 by means of set screws (not shown) or other releasable securing means. The positioning ring 130 rests upon a support ring 132. Thus, it will be observed that as ring 130 is moved upwardly along the outer housing 112, the outer housing 112 is positioned lower and lower with respect to the support ring 132. The support ring 132 has therein leg retaining grooves and within said grooves are tripod legs 134. Supports of ring 130 would preferably have three legs 134 to effectively support the housing unit 18.

In use it will be understood that an inert gas such as nitrogen is supplied through the gas conduit 128 which is permitted under slight pressure to pass down through the can 90 and surround the sensing plate 104 and pass through the individual gas portals 54 and 58 of the support plate 50 when the shutter 56 is closed. Thus, it will be understood that the gas which surrounds the sensing plate 104 passes through the air gap between the sensing plate 104 and the shield 86, and in addition, out through apertures 38 and 48 when the shutter 56 and iris 46 are in an open condition. The presence of the gas substantially inhibits any corona discharge with respect to the sensing means 102 and surrounding elements from igniting organic volatile hydrocarbons, dust particles, or the like which may be present in a highly explosive environment.

In operation, the shutter 56 is opened by the plunger 62 being pulled within the solonoid 60. As the plunger 62 moves inwardly, the arm 82 moves in a substantially counterclockwise direction. The slide arm 80, in response to the arm 82 moves in a counterclockwise condition and against the force of the resilient means or spring 76 opening the shutter 56 and permitting the sensing plate 102 to respond to the electrostatic field by, for example, conduction within its "view". This "view" is determined by the height of the unit 18 from the field, the opening of both the iris 46 and shutter 56. The iris 46 enables the "view" of a limited small area to be accurately read. If, for example, there was no iris, then in an excessive electrostatic field, the housing 18 would have to be moved some distance from the charged surface. The result would be a reading of a much larger area which in the absence of a non-uniform electric field, provides erroneous readings.

After a predetermined period of time which, may be for example two and one half seconds, the shutter 56 is permitted to close. This period is determined by electronic circuitry 200 both within the housing unit 18 and in the carrying case 12. Upon the closing of the shutter 56, by the energization of the solonoid 60, the plunger 62 moves outwardly forcing the arm 82 to move in a clockwise direction and, with the aid of spring 76, causes the shutter 56 to close. At this time the contact arm 88 makes contact with electrical contact 108. The shutter 56 in combination with the inner and outer housing 34 and 112, respectively, the can 90, lid 126, and shields 86 and 84 substantially forms a Faraday cage, the effect of which is to isolate the sensing means 102 from the exterior environment, including the associated electronic circuitry 200. As the steps of opening and closing the shutter 56 are repeated, the meter 14 responds to the periodic exposure of the sensing element 104 to the electrostatic field.

It is believed that the prior art devices employ shutters having anodized leaves. The anodization of these leaves prevents complete electronic contact. Thus, by employing nonanodized leaves herein, the shutter 56, upon closing, effects a Faraday cage.

The electrometer 10 is also provided with a ground line 136 which is affixed to an exterior wall and is in electrical contact with the outer housing 112 and exterior wall. The signal ground may be arbitrally separated from power ground. As will be more fully disclosed in connection with the electronic circuitry of the device, the signal ground may be referenced to power ground or the ground of the power line. This reference is the most commonly employed reference for present-day electrometers. On the other hand the signal ground (S.G.) may be made with reference to a surface, which is above earth ground potential, by attaching the ground line 136 thereto. Finally, the ground line 136 may be left unconnected and the legs 13 insulated from any surface, as by a phenolic sheet for example. As a result, the sensing 102 will read an electrostatic field with respect to a "floating" ground. Thus, for example, in this latter mode of operation, in fair weather, the electrometer 10 acquires a reading of 100 volts per meter above ground any field reading will be in addition to this measurement. Thus, when the housing unit 18 is placed upon a work surface (not shown) readings may be made with respect to that surface. Alternatively, the ground line 136 may be connected to power ground, providing a reference different from the work surface or permitted to "float" with respect to ground and the work surface.

As earlier disclosed the electrometer 10 is provided with a calibration subsystem 32. The calibration subsystem 32 comprises an insulated base member 140. The member 140, which may be made of a phenolic or other insulating material, has a stem or post 142. A ring-shaped calibration support plate 146 is coaxially aligned with respect to the stem 142 and affixed to the insulating base 140, by means well known in the art. Within the support plate 146 are leg receiving aperture for holding the tripod legs 134 of the housing unit 18. Centrally disposed in an aperture 144 of the support plate 146 is a calibration plate 148. The calibration plate 148 has a downwardly extending stem 150 which is secured within the stem 142 of the insulated base 140 and is affixed thereto by means well known in the art. An electrical contact 152 is secured to the stem 142 and in contact with the stem 150 of the calibration plate 148. In a similar manner a contact 154 is secured to the support plate 146. The insulated base 140 has therein a conduit 156. Lines 158 and 160 are secured to the contacts 152 and 154, respectively, and pass through a conduit 156 exterior to the support plate 146.

To calibrate the electrometer 10, housing unit 18 is placed on the support plate 146 and obtains the same potential level. The face of the sensing plate 104 is parallel to the face of the calibration plate 148. Known voltages may be applied to the calibration plate 148 by means of line 158 and contact 152. The iris diaphragm 46 may be adjusted to any desired opening. For example, the total area or total opening may be so adjusted that the entire surface of the sensing plate 104 of the sensing means 102 will be exposed. The potential of housing unit 18 is assured of being at the same potential level as the support plate 146 by the joining of the ground lead 136 with lead 160, which in turn is in contact with contact 154. By placing known negative or positive voltages on the calibration plate 148, the response of the meter 14 of the electrometer 10 may be appropriately calibrated with respect to any desired voltage. A unique relationship is that the ground lead 136 of the electrometer housing 18 enables the entire unit to be placed at a different potential from that of earth ground.

Thus, it will be understood that the legs 134 of the housing 18 may be placed upon any work surface with respect to a source of electrostatic energy to be measured and obtain the same potential as the surrounding surface through use of the ground line 136. However, if actual ground potential or earth ground potential is desired, line 136 may be attached to power ground. In the alternative, as previously dicussed, the line 136 may be left unconnected, the legs 134 insulated from a work surface, the readings made with respect to the electrostatic field in combination with the electrical potential with respect to ground. It is the ability to calibrate this device with respect to any arbitrary signal ground and to shield the sensing means 102 in a Faraday cage at that ground which is considered an important feature of this invention. Of no less importance is the ability of the iris to arbitrarily limit the field.

Changing the relative height of a sensing means 102 above a field would, as in many electrometers, alter the reading and as a result, render inaccurate any particular calibration. By providing the positioning ring 130 and support ring 132, the unit 18 may be calibrated at the desired height and then placed in a reading position with respect to a field. Thus, the electrometer 10 can be maintained calibrated with respect to a field though the relative height of the unit 18 be changed.

A fuller understanding of this invention can be had with reference to the electronic circuitry which control the operation of the unit 18 and particularly the shutter 56 and in addition provides for the measurement through the meter 14 of the readings of electrometer 10. The electronic circuitry 200 (FIG. 4) of the electrometer 10 comprises a sensing circuit 202 which senses and amplifies the sensed electrostatic field. The sensing circuit 202 provides a signal to a metering circuit 204. Power is supplied to the sensing circuit 202 and metering circuit 204 by a regulated power supply circuit 206.

The operation and time of the shutter 56 is controlled through a chopper drive circuit 208 which operates the shutter 56 from a DC or direct-reading setting to an AC or average-reading setting as will be more fully described herein below. Power is supplied to the chopper drive circuit 208 by means of a second regulated power supply 210. Calibration is performed by providing predetermined voltages from calibration circuit 212.

As may be understood, this invention utilizes the principle of passive induction to determine the magnitude and polarity of electrostatic charge eminating from such materials as dielectric webs or the like. If, for example, a plain conductor is placed perpendicular to uniform electric field, it is well known that the conductor will acquire a surface charge by induction. According to Gauss' Law, the amount of charge which can be accumulated on a conductive sheet is predictable. So too, is the relaxation time or the necessary time to remove the accumulated charge. Thus, it has been calculated and demonstrated that the shutter 56 of this invention may be closed for an extremely small time interval and the sensing plate 104 discharged to signal ground and made ready for the next opening period within a very short time. The shortness of time permits great flexibility in the variation of frequency in which the shutter 56 may be cycled.

The electronic circuitry of the sensing means 102 may be highly sensitive. In order to avoid unnecessary capacitance, other stray impedances and interference with any readings it is important to place these circuit elements as proximate the sensing means 102 as possible. For that reason, these elements are best located in the component can 90.

Figure 4:
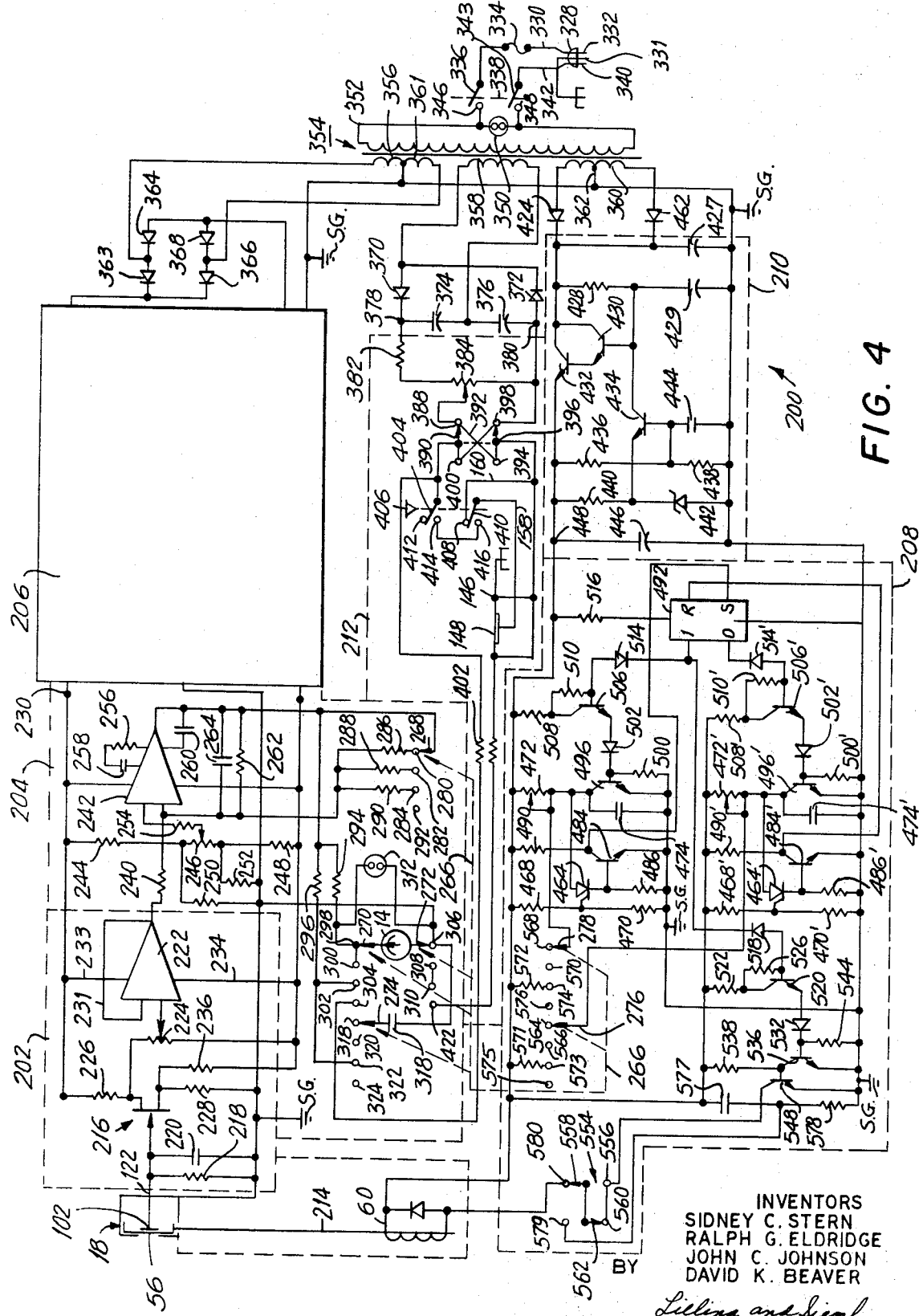
FIG. 4 is a schematic representation of the electronic circuitry constructed in accordance with the teachings of the invention.

The sensing means 102 is shown schematically in FIG. 4 as surrounded by a Faraday cage 18 which is considered synonymous with the housing unit 18. The shutter 56, which upon closing completes the cage, is mechanically interlinked and under the control of the solonoid 60 (the control is indicated schematically by line 214).

The output of the sensor means 104 is fed to a means for amplifying such as a field effect transistor (FET) 216. The FET 216 may, for example, also be an electrometer tube or similar device. The gate of the FET 216 is connected to ground through a large resistor 218 and a parallel connected capacitor 220. The resistor 218 for example could have a value of $10^{12}$ ohms and the capacitor 220 could have a value of approximately 300 pico farads. Any signal received from the sensing means 102 causes the FET 216 to either cut off or conduct in proportion to the magnitude and polarity of the input signal. Amplifier 222 provides a unity gain and presents a high matching input impedance to the FET 216 and a low output impedance to the metering circuit 204. Thus, the amplifier 222 acts as a buffer. The output of the FET 216 is supplied to the amplifier 222 through a potentiometer 224. The moveable contact of potentiometer 224 is connected to the input of amplifier 222 which the fixed contacts are connected respectively to the source of the FET 216 and output terminal 232 of regulator 206. It is to be noted that the amplifier 222 is of the type which is well known in the art and provides substantially unity gain with no inversion of the signal applied thereto. Other types of amplifiers may be equally used. Resistors 226 and 228 are connected respectively to the drain and the source of the FET 216 and the resistor 228 is connected to signal ground (S.G.) while the other resistor 226 is a bias supply resistor for the FET 216 and interconnects the FET 216 to the voltage output terminal 230 of the positive regulator circuit 206. The amplifier 222, as is well known in the art, is provided with a feedback loop 231. In addition, power is supplied by the regulator circuit 206 to the amplifier through input lines 233 and 234.

The regulator circuit 206 having output terminals 230 and 232, is a standard circuit for providing regulated output voltages and current which may be, for example, plus 15 volts at 230 and minus 15 volts at terminal 232 with respect to signal ground (S.G.). While any regulator may be used, one such regulator is manufactured by the Motorola Corporation and is disclosed in the Motorola Microelectronic Data Book, Second Edition, dated December, 1969. The source is coupled to the positive voltage terminal 232 of regulator 206 through resistor 236. The output voltage of amplifier 222 is thus a function of the voltage on sensing means 102.

The output signal provided by amplifier 222 is fed through a resistor 240 to a second amplifier 242. The second amplifier 242 is employed to amplify the difference in voltages between the sensed voltage and signal ground (S.G.). In order that this may be accomplished, a voltage divider is established between the positive voltage output terminal 230 of the first regulator circuit 206, signal ground (S.G.), and the negative terminal output 232 of the first regulator circuit 206. Thus, a resistor 244 is connected in series with resistor 246 and 248 across the terminals 230 and 232 of the regulator circuit 206. In addition, the junction of resistors 244 and 246 is connected through resistor 250 to signal ground (S.G.). In a similar manner, the junction point between resistors 246 and 248 is connected through resistor 252 to signal ground (S.G.). The resistor 246 may be a potentiometer and the voltage may be fed from the variable contact thereof through a resistor 254 into the amplifier 242. The combined effects of resistors 244, 250, 246, 252, and 248 is to act as a voltage divider between the output terminals 230 and 232 of the first regulator circuit 206. The resistance of resistors 254 and 246 are so selected that the voltage between the input to amplifier 242 from resistor 254 with respect to signal ground (S.G.) may be easily adjusted. Thus, resistor 246 is available from the front panel for control section 16 of the carrying case 12 (FIG. 1) such that with the shutter 56 closed and sensing means 102 at signal ground (S.G.) the meter 14 may be adjusted to read zero. As with the amplifier 222, amplifier 242 is connected between the output terminals of 230 and 232 of the regulator circuit 206.

In the particular example of the amplifier 242 selected for this embodiment there is also disclosed resistor 256 capacitors 258 and 260. These passive elements are typically those dictated by the manufacturer of such an amplifier to compensate for frequency effects on the amplifier 242.

Connected between the output of the amplifier 242 and the input from amplifier 222 (but after resistor 240) are the parallel connection of a resistor 262 and a capacitor 264. Resistor 262 provides a fixed resistance in the feedback loop of amplifier 242 while capacitor 264 acts to filter out transients. Clearly, the capacitance of capacitor 264 is quite small. The output of the amplifier 242 is connected through a pole multipoint switch 266 (FIGS. 1 and 4). Each of the poles 268, 270, 272, 274, 276, and 278 are mechanically ganged together as indicated by the dash line. Each pole 268, 270, 272, 274, 276, and 278 has associated therewith four fixed contacts. Connected to the first, second, and third fixed contacts 280, 282, and 284, respectively, of the first pole 286 are resistances 286, 288, and 290, respectively. The fourth contact 292 is unconnected. The other side of these resistances 286, 288, and 290 are coupled together, and, at the same time, to the juncture of resistor 240, resistor 262, and capacitor 264. Thus, in the first position, the feedback loop of amplifier 242 is attenuated by resistor 286. In the second position, the feedback loop of the ampifier 242 is attenuated by resistor 288. In the third position, the feedback loop of amplifier 242 is attenuated by resistor 290. Finally, in the fourth position of pole 268, the feedback loop is essentially open except for the resistor-capacitor combination 262 and 264. The effect of these resistances 286, 288, or 290 is to vary the gain of the amplifier 242. The output signal of amplifier 242 is fed through either resistances 294 or 296 to the meter 14. Resistances 294 and 296 are coupled with the first pole 268 to the output of amplifier 242. Resistor 294 is connected to the first and second fixed contacts 298 and 300 respectively, associated with the second pole 270. The second pole 270 is coupled to one terminal of the meter 14. The third fixed contact 302 associated with the second pole 270 is coupled to resistor 296. The fourth fixed contact 304 is coupled to the calibration circuit 212, as will be more fully described hereinbelow.

The other side of the meter 14 is connected to the third pole 272. The first three fixed contacts 306, 308, 310, associated with the third pole 272, are coupled together and in turn are connected to signal ground (S.G.) so that in the first three positions of the second and third poles 270, 272 place the meter 14 between resistors 294 or 296 and signal ground (S.G.). A two contact output plug 312 is connected, respectively, to the coupled fixed contacts 306, 308, and 310 associated with the third pole 272 and fixed contacts 298 and 300 associated with the second pole 270. The purpose of the output plug 312 is to provide access to an external recorder (not shown). Such a recorder may be employed to provide a permanent record of the sensed electrostatic field.

Thus, the meter 14 reads, in the first two positions of the switch 266, between resistor 294 and signal ground (S.G.) and, in the third position, between resistor 294 and signal ground (S.G.). In the fourth position, the meter 14 is connected across the calibration circuit 212, as will be more fully described hereinafter. The fourth pole 274 is connected via a capacitor 318 to the coupled fixed contacts 306, 308, and 310 associated with the third pole 272. Of the four fixed contacts 318, 320, 322, 324 associated with the fourth pole 274, only the third fixed contact 322 is coupled to resistor 296.

As presently constituted, in the first position of the switch 266, the output of amplifier 242 is coupled to the meter 14 or the connector 312 such that the direct voltage levels on the sensing means 104 are read. In the third position of the switch 266, the resistor 296 is coupled via fixed contact 302, second pole 272 and meter 14 to signal ground (S.G.) and the capacitor 318 is coupled in parallel with the meter 14 through fixed contact 322 and fourth pole 274. Thus, in the third position of the switch 266, the capacitor 318 which may be for example serve as an integrating capacitor of a type that is well known in the art, is placed across the meter 14. The result is that the output of the amplifier 242 is integrated and read by the meter 14 providing an average signal for a plurality of readings by the sensing means 104. In coordination with this, the rate of the opening and closing of the shutter 56 is increased, as will be more fully described below.

It is clear that any variation of the switching arrangement may be feasible in order to give a differing variation in shutter speed readings.

In the present embodiment, power is supplied for example through a three prong plug 328. In ordinary use, power may for example be supplied by a 110 volt 60 cycle source (not shown). Clearly, other sources of power may be used. The power ground prong of the plug 328 may be connected to earth potential. It is important to note that this power ground is separate and distinct from the signal ground (S.G.) of the overall circuitry 200.

One line 300 couples a prong 332 of the plug 320 to one side of a fuse 334 (of a type commonly known in the art). The other side of the fuse 334 is coupled to one pole 336 of a double pole single throw switch 338. The other prong 340 of the plug is coupled, via line 342 to D.P.S.T. switch 338. The D.P.S.T. switch 338 is located on the control panel 16 of the electrometer 10. The fuse 334 appears in FIG. 1 in edge view. Lines 340 and 342 together form cable 344.

Across the fixed contacts 346 and 348 of the D.P.S.T. switch 338 may be a neon light 350. The light 350 serves as a power indicator 350 on the control panel 16. The light 350 is in parallel with the primary 352 of a power transformer 354. The transformer 354 has three output secondaries 356, 358, and 360. The first and third secondaries 356 and 360 are center taped at 361 and 362, respectively. The output power of the first secondary 356 is fed to full wave rectifier diodes 363, 364, 366, 368, as is commonly known in the art. These diodes 363, 364, 366, and 368 provide D.C.

voltage to the first power regulator 206. The center tap 361 of the first secondary 356 is connected to the signal ground (S.G.) of the circuit 200. The second secondary 358 of the power transformer 354 provides power to the calibration system 212. If, for example, the voltage of the primary 354 is 115 volts then the output of the second secondary 358 may be 500 volts AC. This voltage is then rectified by back-to-back diodes 370 and 372 and filtered by capacitors 374 and 376. These passive elements 370, 372, 374, and 376 are arranged in the classic voltage doubler arrangement wherein voltage output appears at terminals 378 and 380.

A resistor 382 is connected at one end to terminal 378. Another resistor 384 is connected to terminals 380. Resistors 382 and 384 are connected in series. Resistor 384 is a potentiometer having its movable contact coupled to the first fixed contact 388 associated with the first pole 390 of a double pole double throw switch 392. This first fixed contact 388 is coupled to the second position fixed contact 394 associated with the second pole 396 of the D.P.D.T. switch 392. The other side of the potentiometer 384 has in common with it the terminal 380 and the first throw position fixed contact 398 associated with the second pole 396 of the D.P.D.T. switch 392. That fixed contact 398 is coupled to the fixed contact 400 corresponding to the second position of the first pole 390. The first pole 390 is in turn coupled to one side of a resistor 402 and the first pole 404 of a double pole throw pushbutton switch 406. The second pole 396 of the switch 392 is connected in turn to the first throw position fixed contact 408 associated with the second pole 410 of the D.P.D.T. pushbutton switch 406 and by line 160 through the support plate 146 of the calibration plate 32. It should be noted that line 160 is joined to power ground. The first position fixed contact 412 associated with the first pole 404 of switch 406 is not connected. The contacts 414 and 416, corresponding to the second position associated with the first and second poles 404 and 410, respectively, of D.P.D.T. pushbutton switch 406, are coupled to one another. The second pole 410 is coupled, via line 158, to the calibration plate 146 and a resistor 418. The other side of resistor 402 is coupled to the fixed contact 304 associated with the fourth position of the second pole 270 of switch 266, and resistor 418 is coupled similarly to the fixed contact 422 associated with the fourth position of the third pole 272 switch 266.

Thus, the calibration of the electrometer 10 is accomplished by selecting a voltage with potentiometer 384. D.P.D.T. switch 392 acts as a polarity reversal switch. The voltage tapped from resistor 384 via terminals 378 and 380 will when D.P.D.T. pushbutton switch 406 is depressed, appear on calibration plate 148. when that switch 406 is released, calibration plate 148 will be grounded to power ground through calibration support plate 146. The calibration support plate 146 is always at a power ground potential to avoid shocks to the user. Thus, when the switch 406 is depressed any reading of the sensing means 102 of the calibration plate 148 is made with reference to power ground. Line 136 (not shown in FIG. 4) may be used to join the signal ground to power ground when in use.

The shutter 56 is driven by means of chopper drive circuit 208. Power is supplied to the chopper drive circuit 208 through the second regulated power supply 210. Voltage is supplied from power transformer 354 at the third secondary 360 to a full wave rectifier diodes 424 and 426. A capacitor 427 filters the output of the full wave rectifier diodes 424 and 426 to signal ground (S.G.) which is also connected to the center tap 362 of the third secondary primary 360. The output of the full wave rectifier diodes 424 and 426 are at the same time coupled to a series connected resistor 428 and capacitor 429. The resistor 428 is coupled to the diode output while the capacitor 429 and the first-mentioned capacitor 427 are tied to signal ground (S.G.) The collectors of two transistors 430 and 432 are coupled to the output of the diodes 424 and 462. The base of transistor 430 is coupled to the juncture of the series connected resistor 428 and capacitor 429. The emitter of transistor 430 is coupled to the base of transistor 432 and the collector of a transistor 434. It is to be noted that the three transistors 430, 432, and 434 are NPN. Any suitable construction may be had, however,. The choice of the transistors configuration is a matter of design. By changing polarity, of the power supply, for example, PNP transistors may be employed.

Connected from the emitter of the second-mentioned transistor 432 to signal ground (S.G.) are a series connected first and second resistors 436 and 438. In parallel with these two resistors 436 and 438 are a series connected third resistor and zener diode, 440 and 442 respectively. In parallel with the second resistor 438 is a capacitor 444. The base of the transistor 434 is coupled via the parallel combination of the resistor 438 and capacitor 444 to ground. The base of transistor 434 is tied to a voltage as determined by the voltage divider resistances of resistors 436 and 438. The emitter of the third transistor 434 is coupled to the juncture of the third resistor 440 and the zener diode 442. The anode of zener diode 442 is coupled to signal ground (S.G.) Connected in parallel with first and second resistors 436 and 438 and the third resistor 440 and zener diode 442 may be a filter capacitor 446. In the example of the second power regulator 210, transistor 432 may be, for example, a heavy duty power transistor. The first transistor 430 acts as a driver to the second transistor 432. The third transistor 434 acts as an amplifier with its emitter, as previously indicated, tied to the cathode of the zener diode 442. The base of the third transistor 434 is held in its operative state by the voltage appearing across the second resistor 432 to signal ground (S.G.). If the output voltage from the emitter of the second transistor 432 should vary, the change in voltage across the first and second resistors 436, 438, will tend to change the conductance of transistors 432. This variation will vary the drive of the first transistor 430 upon the second transistor 432, thus substantially keeping the voltage constant. Capacitor 444 acts as a filter on the base of the third transistor 434, while capacitor 446 acts as a filter across the output of voltage regulator 210. The zener diode 442 provides a constant voltage reference for the emitter of the third transistor 434. Thus, there is provided at the output of the regulator 210 at terminals 448 a highly regulated voltage with respect to signal ground (S.G.). Voltage regulator 210 supplies regulated voltage to the chopper drive circuit 208 from terminal 448 to signal ground (S.G.), which in turn drives the shutter 56.

Two timing circuits operate within the chopper drive circuit 208. The construction of these two timing circuits are substantially identical. Thus, where closely related elements are referred to herein, the reference numbers are primed. Coupled between the voltage output terminal 448 of the second regulator 210 and signal ground are series connected resistors 468 and 470. Connected to the junction of this series connected resistors 468 and 470 is the gate of a uni-junction transistor 464. Connected and parallel with resistors 468 and 470 are a potentiometer 472 and capacitor 474. The variable contact of potentiometer 472 is shorted to the junction point between the potentiometer 472 and capacitor 474. The anode of the uni-junction transistor 464 is coupled to the junction of the potentiometer 472 and capacitor 474. The cathode of the uni-junction transistor 464 is coupled to the base of a transistor 484 and to a resistor 486. This last-mentioned resistor 486 is in turn coupled to signal ground (S.G.). The collector of the transistor 484 is coupled through a load resistor 490 to the output terminal 448 of regulator 210. Initially, with the uni-junction transistor 464 OFF, the transistor 484 having its base coupled to the cathode of transistor 464 is OFF and capacitor 474 will charge to a voltage approaching that appearing at the output of the second regulator 210. As the voltage across the capacitor 474 increases, it approaches the voltage appearing across resistor 470. When this voltage is reached, the uni-junction transistor 464 will "fire" which will, in turn, turn the transistor 484 coupled thereto ON. A short negative going pulse will appear at the Set input of the flip-flop 492. It will be noted that the collector of the transistor 484 is coupled to the set (s) input of a flip-flop 492.

In a similar manner, the output of transistor 484' is connected to the re-set (R) input of the flip-flop 492.

The collector of a transistor 496 is coupled at the junction point of potentiometer 472 and capacitor 474 and the anode of the uni-junction transistor 464. The base of the transistor 496 is coupled through a resistor 500 to signal ground (S.G.). A diode 502 couples the base of the transistor 496 to the emitter of another transistor 506. The emitter of transistor 496 is coupled to signal ground. It is to be noted that all the transistors 484, 496, and 506 are of the NPN type. Clearly, by changing voltage polarity PNP transistors may be used.

The collector of the transistor 506 is coupled through a load resistor 508 to the power output terminal 448 of the regulator 210. The collector is coupled back through resistor 510 to the base of transistor 506. That base of transistor 506 is, at the same time, coupled through a blocking diode 514 to the re-set output terminal of the flip-flop 492.

The base of transistor 506' is, in a similar manner, coupled through blocking diode 514' to the set, output of the flip-flop 492.

Thus, it should be noted that the re-set output of the flip-flop 492 is coupled to diode 514 the re-set input is coupled to the collector of transistor 484'. In addition, the set input of the flip-flop 492 is coupled to the collector of the transistor 484, the set (o) output is coupled to blocking diode 514'.

Turning now to the operation of the timing circuits, it will be assumed that transistor 496 is turned OFF. It will be recalled that the capacitor 474 will charge to the voltage approaching the output voltage of regulator 210. Once the uni-junction transistor 464 is turned ON, as a result of the voltage across the capacitor 474, it turns transistor 484 ON and provides a pulse to the flip-flop 492 at the set(s) input. A signal from the re-set output of flip-flop 492 abruptly ends. In response to the removed flip-flop signal, transistor 506 goes OFF. This, in turn, turns transistor 496 OFF. The differing time constant presented by the respective circuits thus far described are of significance. The charging time determined by potentiometer 472 and capacitor 474 determines the time flip-flop 492 stays in one state. Of shorter duration is that from capacitor 474' and resistor 472'.

It should be noted that the diode 514 is an isolating or blocking diode. As the output of the flip-flop 492 goes to zero, the diode 514 (coupled to the output of the flip-flop 492) is effectively at signal ground (S.G.) and this turns transistor 506 OFF. When the timing circuit having elements 484', 496' etc. provides a signal to the reset input (R) of flip-flop 492 the output to the first timing circuit goes high and diode 514 is back biased. This turns transistor 506 ON which, in turn, turns OFF transistor 496 and capacitor 474 begins to charge again and charges at a rate determined by the time constant of resistor 472 in series of the capacitor 474. The diode 502 acts as a blocking diode.

A resistor 516 is connected from the terminal 448 of the regulator 210 to the flip-flop 492 and serves to provide voltage at a reduced level to the flip-flop 492.

It should be further noted that the open time of the shutter 56 is longer than the closed time. That is, the operating time of the solenoid 60 is asymmetrical, with the closed time being shorter and corresponding to the solenoid 60 being on. The set output of flip-flop 492 is coupled through a diode 518 to a transistor 520. The voltage output from terminal 448 is fed to the transistor 520 through a load resistor 522 to the collector. A base bias resistor 526 interconnects the collector 524 with a base of the transistor 520. The emitter of the transistor 520 is coupled through a diode 532 to the base of a transistor 536. A resistor 538 is a collector load for transistor 536 and is tied to terminal 448 of the regulator 210. The emitter of the transistor 536 is coupled to signal ground (S.G.). The base of this transistor 536 is coupled through resistor 544 to signal ground (S.G.). The collector of transistor 536 is tied to the base of transistor 548. The emitter of the transistor 548 is coupled to signal ground (S.G.) while the collector is coupled through a two pole switch 554 to solenoid 60. Thus, the solenoid 60 acts as a load upon the transistor 548 to which it is coupled. When transistor 548 goes ON it activates solenoid 60. Solenoid 60 upon actuation closes the shutter 56. The diodes 502, 514, 518, and 532 act as blocking diodes. When the flip-flop 492 removes its signal from its re-set (1) output, the diode 518 is placed at signal ground (S.G.). This, in turn, turns the transistor 520 (coupled to the re-set (1) output via diode 518) OFF. In response thereto, the transistor 536 goes ON which in turn turns OFF transistor 548. The collector of transistor 548, is coupled through a two pole switch 554 to the solenoid 60.

The control of the solenoid 60 by the chopper drive circuit 208 will now be more fully described in terms of the operations of the dual timing circuit arrangement. The toggle times of the timing circuits are determined by the potentiometers 472 and 472'. Thus, with transistor 496 OFF, capacitor 474 charges through potentiometer 472 for a period of time determined by the setting of its variable contact. As the voltage on the capacitor 474 approaches the voltage at the junction of resistors 468 and 470, uni-junction transistor 464 turns ON which in turn turns ON transistor 484 which toggles the flip-flop 492 removing the signal from transistor 506 turning ON transistor 496. This prevents capacitor 474 from charging up again. The signal output from the flip-flop 492 is now placed on to diode 514' which in turn, turns ON transistor 506', turning OFF transistor 496' and permits capacitor 474' to begin charging through potentiometer 472'. During this latter period of time, there is no signal at the reset (1) output. Therefore, transistor 520 is OFF, transistor 536 consequently is ON and transistor 548 is OFF. The solenoid 60 is, therefore, deactivated and the shutter 56 is open. The length of time the flip-flop 492 remains in this condition permitting the shutter 56 to be open is determined by the respective positions of the variable contacts of potentiometers 472 and 472'. Thus, the period as well as the opening and closing times of the shutter 56 within a period may be varied. For example, given a period of one complete cycle every 2 seconds, the shutter 56 can be for example, open for 1 second and closed for 1 second for a total cycle time of 2 seconds. Given the same period, the shutter 56 can be open for 1½ seconds and closed for one-half second. In the same manner the toal period or frequency of operation can be varied. The closing of shutter 56 for a shorter period of time while leaving it open for longer period of time extends the longevity of the shutter mechanism.

The collector of transistor 548 is coupled to fixed contact 556 which is associated with first pole 558 of the two pole switch 554. Fixed contact 556 is in turn coupled to fixed contact 560 which is associated in turn with a second pole 562 of the two pole switch 554. Second pole 562 is coupled to first pole 558. Two pole switch 554 is shown in the READ position. In this position, the chopper rate is determined as has been previously indicated, by the timing of potentiometer 472 and capacitor 474 and resistor 472' and capacitor 474'. If the switch 266 and its fifth and sixth poles 280 and 282 are moved in either the first or second positions then the timing constants is established to open the shutter 56 to read directly the voltage on the sensing means 102. This results because the poles 276 and 278 are coupled to the juncture of potentiometer 472 and capacitor 474 and the juncture of potentiometer 472 and capacitor 474 and the juncture of potentiometer 472' and capacitor 474' and because the fixed contacts of the first two throw positions associated with the fifth pole 276 (namely 564 and 566) are the sixth pole 278 (namely 568 and 570) are open. In the third row position, however, it will be noted that fifth and sixth poles 276 and 278 come into contact with resistors 571 and 572 which are connected to the appropriate fixed contacts 573 and 574 associated with the third throw position of the fifth pole 276 and sixth pole 278, respectively. These two resistors 571 and 572 are thus placed in parallel with potentiometers 472 and 472' of the two timing circuits, decreasing the charge time and increasing the shutter rate. It will be appreciated other resistances and switch positions might be established to vary the rate of the shutter to any other desired rate. It is also noteworthy that the fixed contacts 575, 576 associated with the fourth throw of the fifth and sixth poles 276 and 278, respectively, are open.

A capacitor 577 is coupled in series with a resistor 578. The capacitor 577 and resistor 578 combination are coupled from the output terminal 448 of the power source 210 to signal ground (S.G.). The junction of the resistor 578 and the capacitor 577 is coupled to a fixed contact 579 of the two pole switch 554. Two pole switch 554 may be moved to closed position. In that position, the second pole 562 is moved from fixed contact 560 to fixed contact 579. It is a characteristic of this double pole switch 554 that the first pole 558 remains stationary at this time and in contact with fixed contact 580. Solenoid 60 is coupled to fixed contact 580. It should be noted that capacitor 577 is charged to the output voltage of terminal 448 of power unit 210. The resistor 578 acts to limit the current drain by the solenoid 60 in the closed switch position. For example, if the capacitor 577 reaches the output of the voltage of the output of power unit 210 say for example 12 volts, the solenoid 60 will be turned on. The other side of solenoid 60 is coupled to the voltage output terminal 448. In the closed position the solenoid 60 is placed across the capacitor 577. As soon as the solenoid 60 turns on the charge on the capacitor 577 passes through the solenoid 60 closing the solenoid 60. The effect of the resistor 578 is to reduce the current through the solenoid 60. This supplies sufficient current to keep the shutter 56 closed for an extended period of time without over heating the solenoid 60 and permitting internal zeroing by potentiometer 246. In the open position the two pole switch 554 is so rotated that the second pole 562 stays in contact with fixed contact 579 while the first pole 558 rotates to contact with fixed contact 556. The effect of this is to open the solenoid 60 completely, keeping the shutter in an open position permitting extended open operation of the unit. In this position if the two pole switch is merely rotated between the second and third positions the shutter 56 may be manually opened and closed at any rate desired. It is also conceivable that this rotational switch may be handled electrically and internally thus establishing other desired rates.

What is claimed is:

1. An electrometer for measuring an electrostatic field adjacent a surface, comprising:
   a. housing means comprising means for admitting at least a part of the electric field;
   b. sensing means within said housing and responsive to the field for providing a signal indicative of the strength of the field;
   c. shutter means, in combination with said housing means, adapted, in an open condition to permit said sensing means to sense at least a part of the field, and, in a closed condition, electrically shielding said sensing means from the field; and
   d. operating means comprising means for selectively opening and closing said shutter means and means for interpreting said signals so as to provide an indication of the field strength;
   e. means comprising said shutter means in said closed condition, in combination with said housing means, for electrically shielding said sensing means from said means for interpreting said signals;
   and wherein said means for admitting at least a part of the electric field includes iris means for adjustably restricting the amount of the field available to said sensing means when said shutter means is in said open position;

and means for providing an inert fluid to surround said sensing means and inhibit corona discharge into the atmosphere adjacent the work surface.

2. An electrometer as recited in claim 1, wherein said fluid is an inert gas and said sensing means is a metallic conductor.

3. An electrometer as recited in claim 2, wherein:
said iris means is spaced between said shutter means and the work surface;
said housing means having at least one gas-inlet means for directing said inert gas;
said shutter means have apertures for permitting said inert gas provided by said inlet means to pass therethrough to said iris means when said shutter means is in said closed or open condition.

4. An electrometer as recited in claim 1, wherein said shutter means comprises:
a leaf-type shutter,
arm means electrically and mechanically coupled to said leaf shutter,
solonoid means coupled to said arm means for moving said arm means and thereby opening and closing said shutter, and
contact means electrically coupled to said shutter means for driving said sensing means into electrical contact with said housing means upon said shutter means assuming said closed condition.

5. An electrometer as recited in claim 4, wherein said housing means comprises adjustable support means for raising and lowering said sensing means with respect to the surface.

6. An electrometer as recited in claim 5, wherein said means for interpreting said signals comprise means for providing an electrical signal ground substantially independent of electrical power ground, said Faraday cage is electrically in common with said signal ground.

7. An electrometer as recited in claim 6, further comprising:
means insulating said sensing means from said housing means when said shutter means is in an open condition, and
means for selectively joining said signal ground to said power ground.

8. An electrometer as recited in claim 7, further comprising calibrating means for providing predetermined voltages with respect to said sensing means, said means for interpreting said signals comprising indicating means for indicating the strength of the field and means for calibrating said electrometer with respect to said predetermined voltages.

9. An electrometer as recited in claim 8, wherein said calibrating means comprises means for selectively calibrating said electrometer with respect to signal ground, power ground, and independent of grounds.

10. An electrometer as recited in claim 9, wherein said means for calibrating said electrometer comprises means for holding said shutter in a closed condition and adjusting said indicating means to indicate a predetermined level indicative of said signal ground.

11. An electrometer as recited in claim 10, wherein said calibrating means comprises:
at least one conductive plate responsive to said means for interpreting said signals; and
at least one conductive sheet for supporting said housing said selectively providing a reference ground;
said means for interpreting said signals selectively providing to said conductive plate predetermined voltages.

12. An electrometer as recited in claim 11, wherein said indicating means comprises a meter.

13. An electrometer as recited in claim 12, further comprising means for providing an inert fluid to surround said sensing means and thereby inhibit corona discharge into the atmosphere adjacent the surface.

14. An electrometer as recited in claim 13, wherein said fluid is an inert gas and said sensing means is a metallic conductor.

15. An electrometer as recited in claim 14, wherein said iris means is spaced between said shutter means and the work surface, said housing means having at least one gas inlet tube for directing said inert gas, said shutter means having apertures for permitting said inert gas, provided by said inlet tube, to pass therethrough to said iris means when said shutter means is in said closed or open condition.

16. An electrometer as recited in claim 1, further comprises calibration means; said operating means having a signal ground selectively isolated from a power ground; said calibration means comprise plate means for providing an electrostatic field proximate said sensing means for establishing on said plate means predetermined potentials selectively with respect to said power ground and signal grounds.

17. An electrometer for measuring an electorstatic field adjacent a surface, comprising:
housing means comprising means for admitting at least a part of the electric field;
sensing means within said housing and responsive to the field for providing a signal indicative of the strength of the field;
shutter means, in combination with said housing means, adapted, in an open position to permit said sensing means to sense at least a part of the field, and, in a closed position, electrically shielding said sensing means from the field;
operating means comprising means for selectively opening and closing said shutter means and means for interpreting said signal so as to provide an indication of the field strength;
said shutter means in said closed condition, in combination with said housing means, electrically shielding said sensing means from said means for interpreting said signals;
and means for providing an inert fluid to surround said sensing means and inhibit flash fire due to corona discharge into the atmosphere adjacent the work surface.

* * * * *